July 18, 1961 D. CAGNONI 2,992,666
DEVICE FOR THE PEELING OF A TOMATO
Filed Dec. 12, 1956 2 Sheets-Sheet 2

INVENTOR.
D. Cagnoni
BY
Glascock Downing Seebold
ATTYS.

United States Patent Office 2,992,666
Patented July 18, 1961

2,992,666
DEVICE FOR THE PEELING OF A TOMATO
Delfino Cagnoni, Via Borgonuovo 10, Milan, Italy
Filed Dec. 12, 1956, Ser. No. 627,855
Claims priority, application Italy Dec. 13, 1955
11 Claims. (Cl. 146—43)

The difficulties inherent to the peeling of tomatoes are well known to all those who are skilled in this art: these difficulties are inherent to the nature of the fruit itself, since the flesh thereof is of aqueous and soft nature, and this is especially true in the case of fruits in an advanced state of ripeness.

For these reasons the employment of manual peeling, whether preceded or not by physical or chemical preliminary treatments of the fruit in order to render it capable of being readily peeled, has been hitherto practically prevalent in the industry. It is apparent that the manual peeling constitutes a significant source of expenditure which tends to increase the cost of the finished product, as this cost is already somewhat high by reason of the necessity of employing selected fruits, practically deprived of any defect.

It can be therefore easily realized that the studies and the research work developed by the technicians of this particular field of the industry of preserved foods have been directed since the earlier periods towards the solution of the problem of peeling tomatoes with mechanical means.

The mechanical solutions hitherto adopted show, more or less, various drawbacks among which can be mentioned the damage or squeezing of the flesh of the fruit and the removal of part of the flesh together with the peel and the consequent loss of product.

It is an object of the present invention to provide a machine capable of performing the peeling of tomatoes without damaging the fruit while reducing the losses referred to above to a minimum.

It should not be overlooked. even if it is not, strictly speaking, a part of the present invention and forms the subject matter of another invention of the same applicant, that the fruits to be peeled should have undergone a suitable preliminary treatment in order that the peeling may be facilitated.

In any case, irrespective of any preliminary treatment, the device of the invention performs the peeling of tomatoes without damaging the fruits and without unfavorably affecting the inherent properties thereof.

The device of the invention essentially comprises a continuous conveying device, i.e. a conveyor band on which there are mounted in a direction transverse thereof, members capable of thrusting the fruits forwardly; and each one of these members adapted to thrust the fruits forwardly may be equipped, laterally thereof, with members adapted to effectuate the final removal of the peel from the fruit.

Along the longitudinal axis of the conveying device there are mounted continuously extending members, each member being mounted for rotation about a shaft situated in the lowermost part thereof, and lined with a yieldingly resilient material. These latter members are adapted to exert a slight and intermittent compression of the side surface of the fruit to be peeled, so as to eject entirely the fruit from its peel.

A clear and full understanding of the manner in which the invention is actually practised will be afforded by the following detailed description, aided by the accompanying drawings; wherein.

Figure 1:
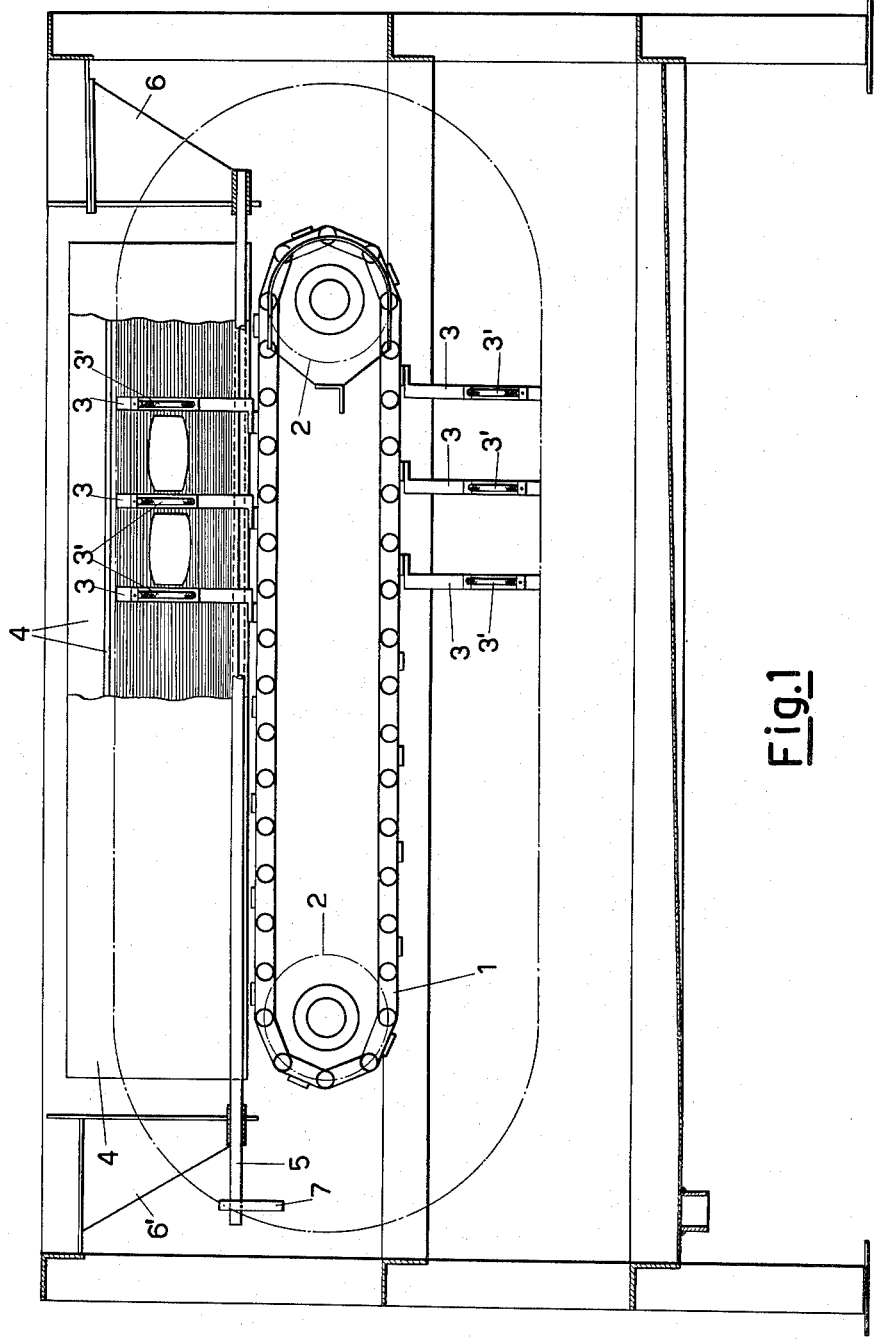
FIG. 1 is a side elevational view of the device according to the invention.

Reference now being had to the drawings, it will be appreciated that the device according to the invention comprises a pair of conveyor chains, e.g. a roller chain 1 actuated by a sprocket wheel 2: on said pair of chains there are mounted, equally spaced apart from one another conveying members proper 3. On the sides of each member 3, which is in the form of a triangular blade, there are two rollers 3', one located on the right hand side and the other one on the left hand side: the function performed by these rollers will be more specifically described later.

Parallel of the longitudinal axis of the conveyor 1, there are mounted pairs of continuously extended members 4: each one of these members is lined with a thick wall of yieldingly resilient material having a high friction coefficient, e.g. sponge rubber the outer surface of which is impervious and rugged, and the same is mounted for rotation about a shaft 5.

The ends of said shaft 5 are carried by hangers 6 and 6', and on one of the ends is mounted an arm 7 to which an intermittent rocking movement in either direction is transferred by a device (not shown) of conventional construction connected thereto.

Figure 2:
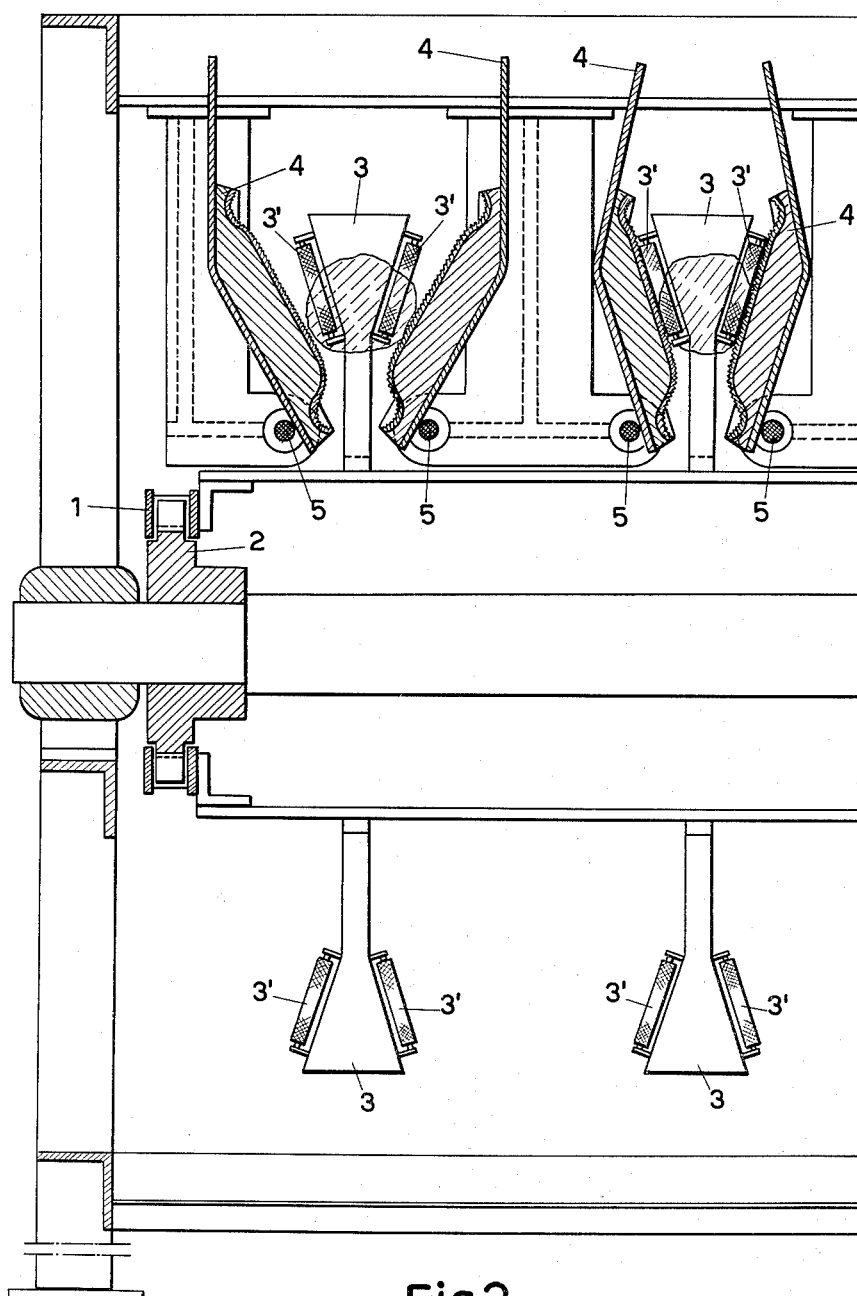
FIG. 2 is an enlarged front elevational view of the device.

The continuously extending members 4 of each pair are mounted to face one another, that is, each pair of said members has the yieldingly resilient walls facing one another, as shown in FIG. 2. Furthermore the intermittent rocking motion of said members takes place so that during a single cycle of rocking motion the members of each pair approach one another during one half cycle and are displaced a substantial distance from each other during the next half cycle and so forth.

The wall of yielding resilient material is inclined from top to bottom so that the tomato to be peeled cannot escape the action of the pair of members 4, irrespective of the size of the fruit.

It is not necessary therefore to classify or sort the fruits according to their sizes.

In FIGURE 2 there are shown two adjacent pairs in working position: the first pair of members, viewing said pairs from the left hand side of an observer of the figures, is in its position of widest opening, that is the members 4 of said pair diverge outwardly, while the second pair of members 4 is in its position of maximum closure, that is the walls of yieldingly resilient material are brought in contact with the side rollers 3' of the conveying blade 3.

The operation of the device is as follows.

Assuming the conveyor 1 is moving, a loading device, not shown in the drawing, loads the tomatoes, which have undergone the preliminary treatment referred to above, and the ends of which have been suitably trimmed so as to interrupt the continuity of the peel.

The conveyor 1, by reason of its motion, moves the conveyor blades 3 carried thereby, and said blades forward the tomatoes towards the unloading end. Meanwhile, as already pointed out, the members 4 of each pair alternately approach or move away from each other because each member swings about its respective shaft 5 as aforesaid: by virtue of said movement the tomatoes, while being forwarded by the conveyor, undergo intermittent compressions on their side surfaces.

For these reasons, the peel of tomato is subjected, at the same time, to the intermittent compression now described, as well as to slippage due to the movement of the fruit conveyed by the conveyor and to the contact of said fruit with the surface of yieldingly resilient high-friction material. More specifically, rise is given to a tangential stress on the surface of the peel due to the combination of the two movements mentioned and said stress acts to cause the ejection of the flesh from the peel integrally.

It may however occur that, as accurate as the selection of the fruits had been, the peel, in some regions of the fruits, adheres to the flesh stickingly: this phenomenon frequently occurs if defects are present in the fruit, even slight defects, for example black spots, or the case may be that the adhesion of the peel to the flesh is great in some regions of the fruits and less marked in other regions. To obviate this drawback is the function of the rollers 3'. It is apparent that, when the members 4 are in the closest position, they contact the rollers 3' of the conveyor blades 3. Since the blades 3 have a translational motion it is clear as well that said rollers, as they come into contact with the member 4, are caused to rotate in that they are mounted for idle rotation about their respective axles.

Therefore the peel partially removed from the flesh but still adhering thereto in some limited region, is gripped between the roller and the resilient wall of the member 4: the short rotation of the roller exerts a stripping-like action of the peel and said action is certainly of such a magnitude as to overcome the resistance due to the particularly strong adhesion of the peel in some limited region of the fruit. The length of travel of the fruit from the loading end to the unloading end is of about 80–100 cm. and the height of the continuously extended members 4 is of about 20 cm.: it is obvious that such dimensions are merely illustrative and are not to be construed as limiting the invention.

The advantages of the device of the invention are fully apparent: firstly, the members which alternately compress the side surfaces of the fruit are such, due to the nature of their yielding resilient lining as well as to their periodical movement without shocks, as to perform the removal of the peel in a complete and efficient way.

The side rollers positively ensure the total removal of the peel for they function whenever, for any reason, the adhesion of the peel to the flesh is greater than usual. There is furthermore an apparent advantage with respect to the manual peeling since by adopting the device of the invention the fruit under peeling is subjected to a much less marked stress than with the usual processes. It is recalled here that the manual peeling consists in an energetic squeezing during which it is necessary, first, to cause the rupture of the peel and eventually the ejection of the peeled fruit. The evident saving of labor attained by adopting the device of the invention is manifest and the machine performs in an automatic and satisfactory way an operation which had been performed almost always by hand and imperfectly with the hitherto known processes.

I claim:

1. An assembly for peeling tomatoes comprising, in combination, a continuous endless conveying means, a plurality of spaced apart members mounted on the conveying means spaced longitudinally of the conveying means and extending transversely of the conveying means, with each member serving to thrust forwards a tomato to be peeled, pairs of extended members positioned adjacent to said conveying means and parallel to the longitudinal axis thereof, the two members of each pair forming a trough narrow enough at the bottom to prevent tomatoes from falling through, yet wide enough that said spaced apart members mounted on said conveying means can pass between said extended members, and said extended members movable toward and away from each other, a lining of yieldingly resilient material having a high friction coefficient on one face of each extended member, and roller elements mounted on each side of each of said spaced apart members for rotation about an axis parallel to said side of said spaced apart member, said roller elements being cooperable with said lining of said extended members when said extended members are in a position engaging said rollers so that any peel adhering to a tomato is gripped between one of said roller elements and said lining thereby removing said peel.

2. An assembly for peeling tomatoes comprising, in combination, a continuous endless conveying means, a plurality of spaced apart members mounted on the conveying means spaced longitudinally of the conveying means and extending transversely of the conveying means, with each member serving to thrust forwards a tomato to be peeled, pairs of extended members positioned adjacent to said conveying means and parallel to the longitudinal axis thereof, a lining of yieldingly resilient material having a high friction coefficient on one face of each extended member, and means for periodically narrowing and reopening the tomato path provided by said extended members to such a degree that a tomato in said path will be compressed intermittently, and roller elements mounted on each side of each of said spaced apart members for rotation about an axis parallel to said side of said spaced apart member, said roller elements being cooperable with said lining of said extended members when said extended members are in a position engaging said rollers so that any peel adhering to a tomato is gripped between one of said roller elements and said lining thereby removing said peel.

3. An assembly for peeling tomatoes comprising, in combination, a continuous endless conveying means, a plurality of spaced apart members mounted on the conveying means spaced longitudinally of the conveying means and extending transversely of the conveying means, with each member serving to thrust forwards a tomato to be peeled, pairs of extended members positioned adjacent to said conveying means and parallel to the longitudinal axis thereof, the two members of each pair forming a trough narrow enough at the bottom to prevent tomatoes from falling through, yet wide enough that said spaced apart members mounted on said conveying means can pass between said extended members, and said extended members movable toward and away from each other, a lining of yieldingly resilient material having a high friction coefficient on one face of each extended member, and means for periodically narrowing and reopening the tomato path provided by said extended members to such a degree that a tomato in said path will be compressed intermittently, and roller elements mounted on each side of each of said spaced apart members for rotation about an axis parallel to said side of said spaced apart member, said roller elements being cooperable with said lining of said extended members when said extended members are in a position engaging said rollers so that any peel adhering to a tomato is gripped between one of said roller elements and said lining thereby removing said peel.

4. Peeling apparatus for comestibles comprising a base, a conveyor mounted on said base, pushers mounted on said conveyor, means for actuating said conveyor, and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, a roller mounted on a lateral side of said pusher, and means for placing said roller in contact with one of said walls during motion of said pushers in said path, whereby as said pushers force said comestibles along said space, said roller rotates in contact with said walls and pinches said skin against said walls.

5. Peeling apparatus for comestibles comprising a base, a conveyor mounted on said base, pushers mounted on said conveyor, means for actuating said conveyor, and pushers in a longitudinal path relative to said base, walls on said base adjacent to and spaced from said pushers along the path thereof, said walls defining between them a longitudinal space constructed and arranged to receive said comestibles converging to a relatively narrow constriction whereby said comestibles are supported in said space by said converging walls, material of high friction coefficient mounted on those faces of said walls which contact said comestibles, a pair of rollers mounted on each of said pushers, one said roller on each lateral side of each pusher, and means for placing said rollers in contact with said walls during motion of said pushers in said path, whereby as said pushers force said comestibles along said space, said rollers rotate in contact with said walls and pinch said skin against said walls.

6. Peeling apparatus for comestibles comprising a base, a conveyor mounted on said base, pushers mounted on said conveyor, means for actuating said conveyor, and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, yieldingly resilient material mounted on those faces of said walls which contact said comestibles, a pair of rollers mounted on each of said pushers, one said roller on each lateral side of each pusher, and means for placing said rollers in contact with said walls during motion of said pushers in said path, whereby as said pushers force said comestibles along said space, said rollers rotate in contact with said walls and pinch said skin against said walls.

7. Peeling apparatus for comestibles comprising a base, a conveyor mounted on said base, pushers mounted on said conveyor, means for actuating said conveyor, and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, a pair of rollers mounted on each of said pushers, one said roller on each lateral side of each pusher, and means for intermittently placing said rollers in contact with said walls during motion of said pushers in said path, whereby as said pushers force said comestibles along said space, said rollers rotate in contact with said walls and pinch said skin against said walls.

8. Peeling apparatus for comestibles comprising a base, a conveyor mounted on said base, pushers mounted on said conveyor, means for actuating said conveyor, and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, a pair of rollers mounted on each of said pushers, one said roller on each lateral side of each pusher, means for placing said rollers in contact with said walls during motion of said pushers in said path, whereby as said pushers force said comestibles along said space, said rollers rotate in contact with said walls and pinch said skin against said walls, and means for intermittently moving said walls in both to squeeze and to contact and to rotate said rollers.

9. Peeling apparatus for comestibles comprising a base, a conveyor mounted on said base, pushers mounted on said conveyor, means for actuating said conveyor and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, material of high friction coefficient mounted on those faces of said walls which contact said comestibles, a pair of rollers mounted on each of said pushers, one said roller on each lateral side of each pusher, means for placing said rollers in contact with said walls during motion of said pushers in said path, whereby as said pushers force said comestibles along said space, said rollers rotate in contact with said walls and pinch said skin against said walls, and means for intermittently moving said walls in both to squeeze and to contact and to rotate said rollers.

10. Peeling apparatus for comestibles comprising a base, a conveyor mounted on said base, pushers mounted on said conveyor, means for actuating said conveyor and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, yieldingly resilient material mounted on those faces of said walls which contact said comestibles, a pair of rollers mounted on each of said pushers, one said roller on each lateral side of each pusher, means for placing said rollers in contact with said walls during motion of said pushers in said path, whereby as said pushers force said comestibles along said space, said rollers rotate in contact with said walls and pinch said skin against said walls, and means for intermittently moving said walls in both to squeeze and to contact and to rotate said rollers.

11. Peeling apparatus for comestibles comprising a base, a conveyor mounted on said base, pushers mounted on said conveyor, means for actuating said conveyor and pushers in a longitudinal path relative to said base, walls on said base adjacent to and spaced from said pushers along the path thereof, said walls defining between them a longitudinal space constructed and arranged to receive said comestibles and converging to a relatively narrow constriction whereby said comestibles are supported in said space by said converging walls, a pair of rollers mounted on each of said pushers, one said roller on each lateral side of each pusher, means for intermittently placing said rollers in contact with said walls during motion of said pushers in said path, whereby as said pushers force said comestibles along said space, said rollers rotate in contact with said walls and pinch said skin against said walls, and means for intermittently moving said walls in both to squeeze and to contact and to rotate said rollers.

References Cited in the file of this patent

UNITED STATES PATENTS

| Number | Name | Date |
|---|---|---|
| 956,426 | Rowland et al. | Apr. 26, 1910 |
| 1,122,859 | Chase et. al. | Dec. 29, 1914 |
| 1,124,487 | Maull | Jan. 12, 1915 |
| 1,669,263 | Pugh | May 8, 1928 |
| 1,757,308 | Ingraham | May 6, 1930 |
| 1,780,924 | Ingraham | Nov. 11, 1930 |
| 2,115,126 | Skinner | Apr. 26, 1938 |
| 2,279,685 | Kaplan | Apr. 14, 1942 |